United States Patent [19]

Dacquay

[11] Patent Number: 5,191,588
[45] Date of Patent: Mar. 2, 1993

[54] HIGH EFFICIENCY, HARMONIC WAVELENGTH LASER SYSTEM

[75] Inventor: Bruno Dacquay, Aubiere, France

[73] Assignee: Alcon Surgical, Inc., Fort Worth, Tex.

[21] Appl. No.: 842,018

[22] Filed: Feb. 25, 1992

[51] Int. Cl.$^5$ .............................................. H01S 3/10
[52] U.S. Cl. ...................................... 372/22; 372/703; 372/41; 372/21; 372/98; 372/107; 372/108; 359/328
[58] Field of Search ..................... 372/22, 21, 41, 98, 372/703, 107, 108; 359/328

[56] References Cited

U.S. PATENT DOCUMENTS

| | | |
|---|---|---|
| 3,949,323 | 4/1976 | Bierlein et al. |
| 4,739,507 | 4/1988 | Byer et al. .............................. 372/22 |
| 4,826,283 | 5/1989 | Chuangtian et al. |
| 4,879,723 | 11/1989 | Dixon et al. ........................... 372/21 |
| 4,907,235 | 3/1990 | Kuizenga |
| 4,933,944 | 6/1990 | McGraw ................................ 372/22 |
| 5,027,361 | 6/1991 | Vozlovsky et al. ................... 359/328 |

OTHER PUBLICATIONS

*Solid-State Laser Engineering*, Second Edition, Koechner, Walter, Chapt. 5 and 10, pp. 168-246; 477-539 (1988).

*Primary Examiner*—Leon Scott, Jr.
*Attorney, Agent, or Firm*—Jeffrey S. Schira

[57] ABSTRACT

A linear cavity laser system having a yttrium-aluminum-garnet laser rod for producing a fundamental wavelength of radiation having a front face and a longitudinal axis, a first mirror reflective of the fundamental wavelength but transmissive of a desired harmonic wavelength located in front of the laser rod along the longitudinal axis, a second mirror reflective of both the fundamental wavelength and the desired harmonic wavelength located to a rear of the lasing rod along the longitudinal axis, a phase matched crystal harmonic wavelength generator responsive to the fundamental wavelength for generating the desired harmonic wavelength of radiation arranged between the front mirror and the lasing rod along the longitudinal axis and a dichroic member transmissive of the fundamental wavelength but reflective of the harmonic wavelength arranged between the laser rod and the harmonic wavelength generator along the longitudinal axis.

57 Claims, 4 Drawing Sheets

5,191,588

HIGH EFFICIENCY, HARMONIC WAVELENGTH LASER SYSTEM

BACKGROUND OF THE INVENTION

The present invention relates in general to laser and nonlinear optical equipment, and more particularly to laser equipment in which the energy of an input fundamental wavelength is converted into a different output wavelength.

Laser systems have been widely utilized in the medical field for the treatment of tissue. The high intensity energy of a laser beam can be concentrated into a small cross-sectional area and used with different types of tissues to accomplish different functions, such as cutting, cauterizing, cell destruction, etc. It is well known that laser systems operating with various fundamental wavelengths are advantageous for different types of operations. For example, in ophthalmic surgical operations, it has been found that a YAG-type laser generating a wavelength of 1.064 or 1.32 nanometer (nm) is especially advantageous for cyclophotocoagulation. It can be appreciated that in other medical-surgical applications, certain wavelengths of laser beams are more advantageous than others.

The various well-known laser mediums, such as crystals, semiconductors, gases and dyes, each generate a characteristic fundamental wavelength of coherent radiation. While there are available a host of lasing mediums available for generating a corresponding number of laser radiation beams having desired fundamental wavelengths, there exists certain wavelengths which may be desirable to generate, but in which there currently exists no lasing medium for generating the desire fundamental wavelength. In addition, many businesses specializing in the design and development of laser systems also specialize in one or a few particular types of mediums, such as crystals or semiconductors, etc., and do not develop an expertise in working with other types of mediums, such as gases and dyes. Accordingly, it often occurs that laser radiation beams of certain wavelengths are desirable, but are unavailable because of the particular mediums with which the developer is familiar.

One technique for generating an output laser radiation beam having a different wavelength than that generated by the laser medium is by the use of wavelength doubling or tripling crystals. Specialized harmonic crystals have been developed for use with currently available laser mediums to provide an output wavelength different from the characteristic wavelength generated by the lasing medium itself. Disclosed in U.S. Pat. Nos. 3,949,323 (DuPont) and 4,826,283 are techniques for fabricating a harmonic crystal for use with lasing mediums, where the crystal is responsive to an input fundamental wavelength to produce an output harmonic wavelength. The disclosure of these patent is incorporated herein by reference. Crystals adapted for generating harmonic wavelengths include the following types: Potassium dihydrogen phosphate (KDP or $KH_2PO_4$), Potassium dideuterium phosphate (KD*P or $KD_2PO_4$), Potassium titanyl phosphate (KTP or $KTiOPO_4$), Lithium triborate (LBO or $LiB_3O_5$), Beta-barium borate (BBO), KTA, lithium niobate doped with MgO, Lithium iodate ($LiIO_3$), $MgO:LiNbo_3$, RbTP, RbTA, YAB, $KNbO_3$, Urea, BANANA crystals, and others. Such type of crystals are generally grown and cut along certain axes which are phase matched according to the harmonic wavelength desired, and thus provide maximum efficiency at such wavelength. These crystals can be pumped or otherwise energized with the fundamental wavelength produced by a lasing medium, whereupon the desired harmonic wavelength of radiation is emitted. A more complete discussion of nonlinear devices and crystals used in such devices can be found in W. Koechner, *Solid-State Laser Engineering* (2d ed. 1988), which is incorporated herein by reference.

An application of a laser system generating fundamental/harmonic wavelengths is illustrated in U.S. Pat. No. 4,907,235, the entire contents of which are incorporated herein by reference. FIG. 13 of the noted patent illustrates a system using a nonlinear crystal between the frontal mirror and the lasing medium. While such a system appears to be effective in producing an output harmonic wavelength, any harmonic wavelengths reflected internally by the removal means can be absorbed by the lasing medium, thereby losing this laser energy and unnecessarily increase the temperature of the lasing medium.

This patent, in FIGS. 9, 10, 11 and 12, also illustrates a linear system, as opposed to the folded systems illustrated in FIGS. 8, 14, 15, 16, 17, 18, 19, 20, 21, 22, 23, 24 and 25. However, the illustrated linear systems do not produce a harmonic output at the end of the system. Rather, the harmonic output is produced along an axis that intersects the longitudinal axis of the lasing medium and requires an angled harmonic removal medium. Angling the removal medium polarizes the fundamental radiation output of the lasing medium thereby reducing the corresponding harmonic output of the system.

From the foregoing, it can be seen that a need exists for an improved linear cavity adapted for generating a harmonic wavelength and in which the harmonic wavelength internal to the cavity is substantially prevented from being reflected to or reaching the lasing medium.

BRIEF SUMMARY OF THE INVENTION

In accordance with the invention, there is disclosed a high efficiency laser system producing an output harmonic wavelength. According to the preferred form of the invention, a wavelength is generated, but such wavelength cannot be reflected back to the lasing medium. A crystal, phase matched to a desired harmonic wavelength, is disposed in the linear cavity between a frontal mirror and a reflective/transmissive isolator which reflects the harmonic wavelength from the crystal toward the frontal mirror and which transmits any remaining fundamental wavelength therethrough back to the laser medium for further amplification. The reflective/transmissive member thereby isolates the harmonic wavelength, but reflects the fundamental wavelength back to the crystal for conversion to the harmonic wavelength.

An important technical advantage of the invention is that the efficiency is increased, in that a major portion of the fundamental wavelength of radiation emitted from the lasing medium is transmitted through the reflective/transmissive isolator to the crystal for generation of the harmonic wavelength. Additionally, any component of the fundamental wavelength that is reflected back to the crystal doubler from the frontal mirror is then converted to the harmonic wavelength for output from the system.

An additional technical advantage of the invention is that with the reflective/transmissive filter located between the crystal and the lasing medium, the harmonic wavelength is prevented from being transmitted back to the other optical components of the system. A higher portion of the harmonic wavelength is thereby produced at the output, and not absorbed internally in the system and dissipated as heat.

DETAILED DESCRIPTION OF THE INVENTION

Figure 1:
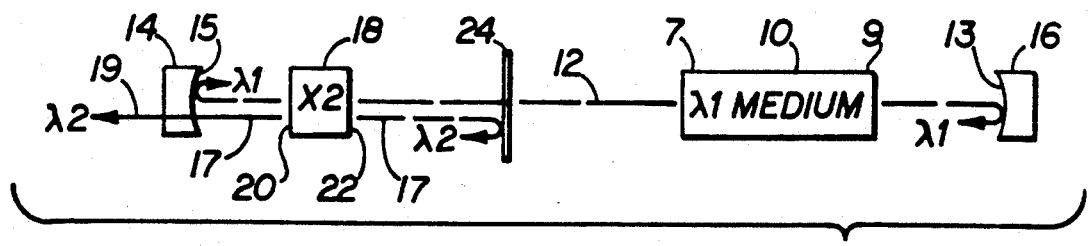
FIG. 1 is a diagrammatic view of the linear cavity of one embodiment of the invention employing harmonic wavelength generating and isolation elements.

FIG. 1 diagrammatically illustrates the major elements of a linear laser cavity adapted for the internal generation of a fundamental wavelength and the overall output of a harmonic wavelength of radiation. In other words, the output of the laser system is different from that generated by the laser medium itself. In this manner, currently available lasing mediums can be used as a basis for efficiently generating yet other coherent, monochromatic beams of radiation characteristic of lasers.

With particular reference to FIG. 1, the laser system according to the preferred form of the invention includes lasing medium 10 which is pumped by an energy source (not shown) to generate intra-cavity fundamental wavelength 12 of frequency $\lambda 1$. In the medical field, lasing medium 10 is preferably either a yttrium-aluminum-garnet (YAG) rod producing fundamental wavelengths of about 1.064 or 1.32 nanometers (nm), or a yttrium-lithium-fluoride (YLF) type rod producing characteristic fundamental frequencies of 1.054 or 1.32 nm. Situated at opposing ends of the laser system, aligned with axis of lasing medium 10, are intra-cavity reflecting frontal mirror 14 and intra-cavity reflecting rear mirror 16. Mirrors 14 and 16 are of conventional design and commercially available from sources such as CVI Laser. Frontal mirror 14 is of the type that is coated with a conventional material such as a multilayer dielectric stack so as to be fully transmissive with respect to output harmonic wavelength 17 of frequency $\lambda 2$, but fully reflective with respective to fundamental wavelength 12. In contrast, rear reflective mirror 16 is fully reflective with respect to fundamental wavelength 12. Inner surface 15 of frontal mirror 14 can be coated with a dichroic reflector so that it is transmissive with respect to harmonic wavelength 17 and is reflective with respect to fundamental wavelength 12. Intracavity surface 13 of rear mirror 16 can be coated or otherwise processed so that it is reflective with respect to fundamental wavelength 12 only, as harmonic wavelength 17 does not enter this portion of the laser cavity. While the term "harmonic" generally connotes an integer multiple of a fundamental, such term is used herein to also define subharmonics of the fundamental. For example, a phase matched crystal responsive to a 1.064 nm fundamental wavelength is considered herein as generating a harmonic wavelength of 0.532 nm.

The laser system illustrated in FIG. 1 further includes a harmonic crystal 18 phase matched with respect to harmonic wavelength 17. While harmonic crystal 18 is identified as being adapted to double the frequency of the fundamental frequency, other harmonics can be generated and used as an output of the system. Harmonic crystal 18 is formed or ground in such a manner that it responds to a fundamental wavelength of radiation directed to either its frontal face 20 or its rear face 22 for emitting a harmonic wavelength on a respective opposite face. In other words, fundamental wavelength 12 generated by lasing medium 10 and direct to face 22 of crystal doubler 18 results in harmonic wavelength 17 emitted from face 20. On the other hand, fundamental wavelength 12 reflected from internal surface 15 of frontal mirror 14 is directed to face 20 of crystal doubler 18 and results in harmonic wavelength 17 being emitted from face 22.

In accordance with an important feature of the invention, a harmonic wavelength isolator 24 is disposed in the cavity, perpendicular to the axis of lasing medium 10. Harmonic wavelength isolator 24 is preferably of the type which is totally reflective of harmonic wavelength 17 present on the left side of isolator 24 and is totally transmissive to fundamental wavelength 12 whether directed in the right hand or left hand direction. Because crystal doubler 18 is the mechanism for generating harmonic wavelength 17, and because isolator 24 is highly reflective of harmonic wavelength 17, such wavelength 17 does not enter that portion of the cavity on the right hand side of harmonic isolator 24. The location of isolator 24 between lasing medium 10 and doubler 18 can be adjusted without altering fundamental wavelength 12.

Accordingly, any component of harmonic wavelength 17 emitted in the right hand direction from crystal doubler 18 is reflected by harmonic isolator 24, and thus cannot be absorbed and lost in lasing medium 10. To that end, the efficiency of the system if improved in that the only portion of harmonic wavelength 17 emitted is by way of the output from frontal reflecting mirror 14.

According to the preferred embodiment of the invention, harmonic isolator 24 comprises a glass substrate having formed thereon dichroic coatings or layers which are transmissive of fundamental wavelength 12, and highly reflective of the harmonic wavelength 17. Dichroic isolators are well known in this art for accomplishing such a function. Such isolators include those manufactured at CVI Laser and Virgo Optics.

The operation of the laser system depicted in FIG. 1 is carried out as follows. Sufficient energy is pumped or otherwise transferred to medium 10 until it begins lasing at fundamental frequency 12. Medium 10 emits radiation of fundamental frequency 12 from both ends. The radiation of fundamental wavelength 12 emitted from right hand end 9 of medium 10 is reflected from surface 13 on rear cavity mirror 16 and is returned to lasing medium 10 for further amplification. Fundamental wavelength 12 emitted from left hand end 7 of lasing medium 10 is transmitted through harmonic isolator 24 and directed onto face 22 of crystal doubler 18. In response to fundamental wavelength 12, crystal doubler 18 emits a major amount of its harmonic wavelength 17 from face 20, but yet emits some degree of harmonic wavelength 17 from face 22. The major portion of harmonic wavelength 17 exiting crystal doubler 18 from face 20 is transmitted from frontal mirror 14 and defines the λ2 output 19 of the system. The remaining portion of harmonic wavelength 17 emitted from face 22 of doubler 18 is reflected from isolator 24 and is returned to crystal doubler 18 to be retransmitted from face 20, through frontal mirror 14 and is additive to system output 19. On the other hand, any component of the fundamental wavelength 12 that passes through or around doubler 18 to the left is reflected from frontal mirror 14 and returned to doubler 18 for conversion into harmonic wavelength 17. Preferably, the harmonic crystal defining doubler 18 is of sufficient size with respect to frontal mirror 14 such that substantially all of fundamental wavelength 12 energy reflected therefrom is redirected onto face 20 of crystal doubler 18. With this arrangement of optical components, it can be seen that the efficiency by which fundamental wavelength 12 is converted to a corresponding harmonic wavelength 17, is optimized. It will be understood that both fundamental wavelength 12 and harmonic wavelength 17 are reflected coaxially along the same path (i.e., the longitudinal axis of lasing medium 10).

Figure 2:
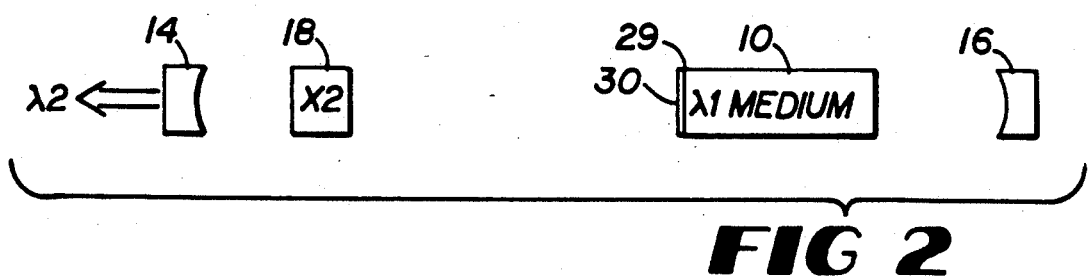
FIG. 2 is a diagrammatic view of the linear cavity of a second embodiment of the invention in which the harmonic wavelength isolator is formed as a coating on the frontal face of the lasing medium.

With reference now to FIG. 2, there is shown the basic system of FIG. 1, except rather than providing the harmonic wavelength isolator as a separate element, it is formed on frontal face 29 of lasing medium 10. This embodiment has the advantage of not requiring additional apparatus to physically mount the isolator in the laser system in alignment with the longitudinal axis of medium 10. Rather, the reflective/transmissive dichroic material or layer is formed on frontal face 29 of lasing medium 10. When formed on frontal face 29 of medium 10, harmonic wavelength isolator 30 performs the same function as described above in connection with FIG. 1. Substantially all of fundamental wavelength 12 that is emitted by lasing medium 10 must necessarily pass through harmonic isolation layer 30. In like manner, because isolation 30 fully covers frontal surface 29 of lasing medium 10, no harmonic wavelengths 17 can enter lasing medium 10 and be absorbed thereby.

Figure 3:
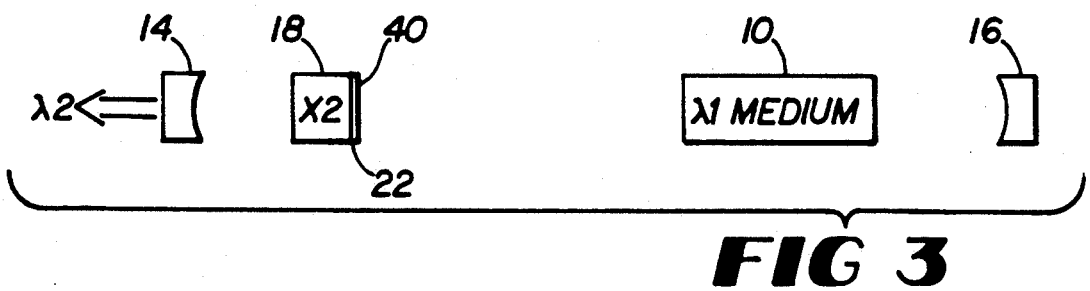
FIG. 3 is a diagrammatic view of the linear cavity of a third embodiment of the present invention, in which the harmonic wavelength isolator is formed as a coating on the rear face of the harmonic crystal.

With reference to FIG. 3, yet another embodiment of the laser system is illustrated. Here, harmonic wavelength isolator 40 is formed on rear face 22 of crystal doubler 18. Again, by forming dichroic layer 40 on back face 22 of crystal doubler 18, additional mounting hardware or brackets are not required. Because doubling crystal 18 is generally of a cross-sectional area larger than that of lasing medium 10, harmonic isolator 40, also being of an equally large cross-sectional area, prevents any of harmonic wavelength 17 from being emitted from back face 22, without being reflected by harmonic isolator 40.

Figure 4:
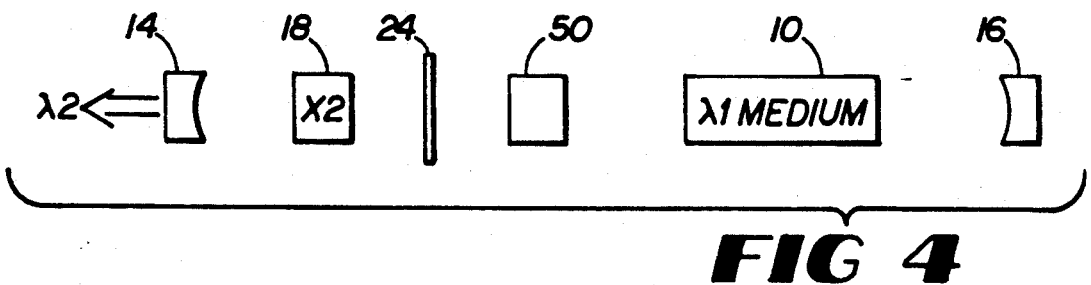
FIG. 4 is a diagrammatic view of the linear cavity of a fourth embodiment of the present invention similar to FIG. 1, but includes fundamental wavelength focusing elements.

FIG. 4 illustrates yet another embodiment of the invention that is similar to FIG. 1, but with the addition of focusing components 50 for focusing fundamental wavelength 12 onto crystal doubler 18. It is contemplated that electro or acousto-optical elements can be used with the laser system of the invention to provide greater efficiency. Essentially, fundamental wavelength 12 emitted from lasing medium 10 is focused by components 50 into crystal doubler 18. The focusing components can be a lens or arrangement of lenses.

Figure 5:
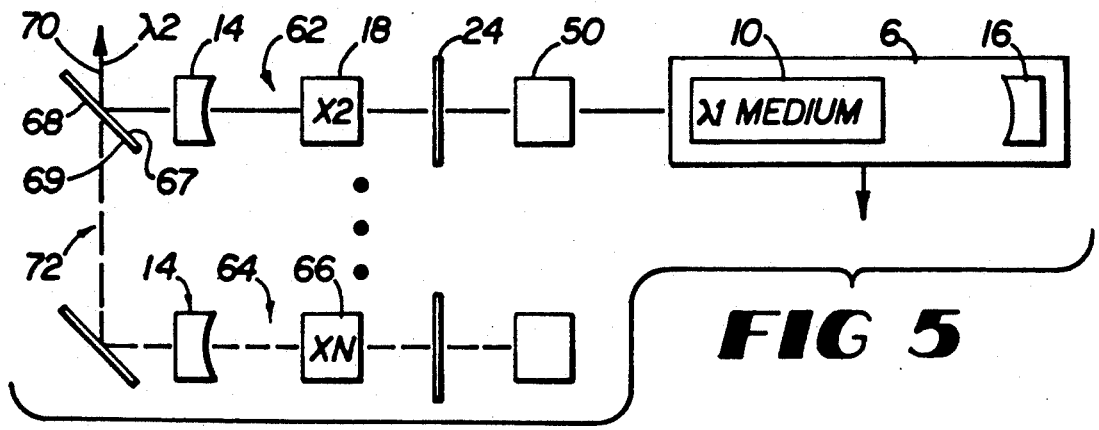
FIG. 5 is a diagrammatic view of the multiple laser cavity system with a single laser medium movable with respect to one of two harmonic crystals.

FIG. 5 illustrates another laser system using multiple sets of harmonic crystals and associated optical components and a single lasing medium that is movable so as to provide numerous, different harmonic wavelength outputs. A combination laser medium 10 and rear mirror 16 are movable together as a composite unit 6 in alignment with a desired harmonic crystal assembly, denoted as reference numerals 62 and 64. Alternatively, laser medium 10 can be moved independently with multiple mirrors 16. Laser medium assembly 60 is shown aligned with the optical components associated with crystal doubler 18. Crystal 18 is effective to change the fundamental frequency by a factor of two. Harmonic crystal assembly 64 is illustrated with a crystal 66 that is effective to produce a harmonic of the fundamental wavelength, such harmonic being of the Nth order. In this manner, by using different harmonic crystals 18 or 66, a single laser medium 10 producing a single fundamental wavelength λ1 can produce numerous different harmonic outputs λ2. Associated with each harmonic crystal assembly 62 and 64 is a mirror 68 that is reflective to wavelengths incident to its frontal side 67, but is fully transmissive as to wavelengths incident to back side 69. With this arrangement, the output of each harmonic crystal assembly 62 or 64 can be combined into a single output of 70 along axis 72. It will be understood that isolator 24 also may be formed of on laser medium 10 or harmonic crystal 18 as illustrated in FIGS. 2 and 3.

Figure 6:
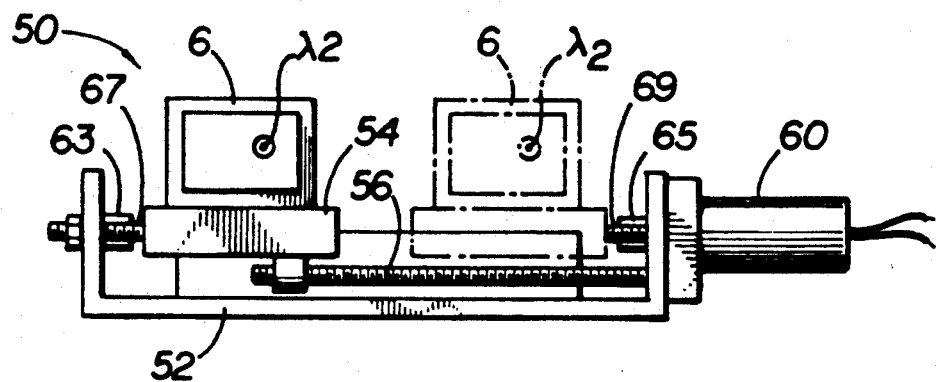
FIG. 6 is a front elevational view of the multiple laser cavity system illustrated in FIG. 5.
Figure 7:
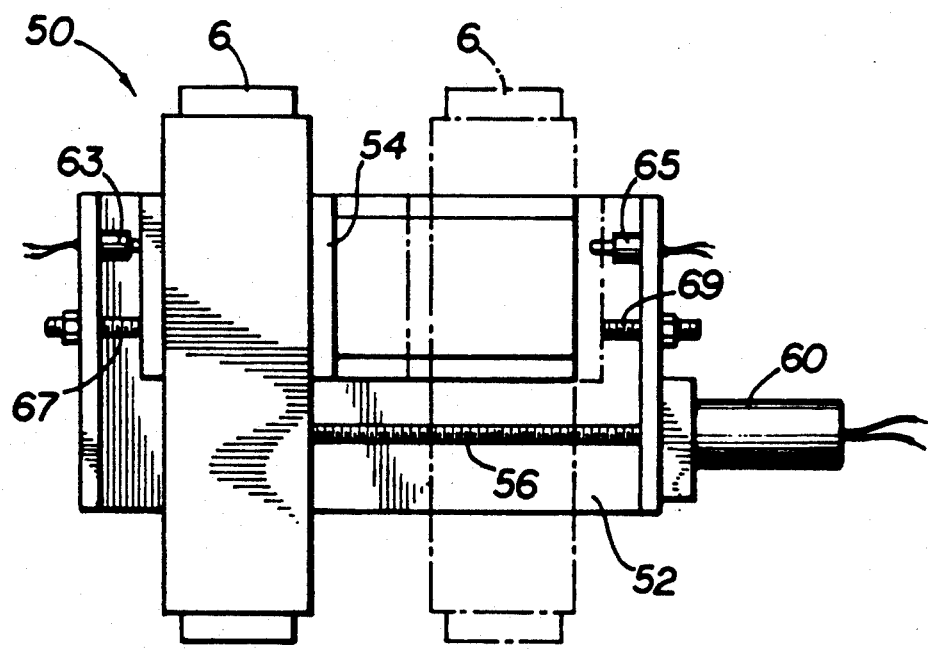
FIG. 7 is a top plan view of the multiple laser cavity system illustrated in FIGS. 5 and 6.

The means used to move laser unit 6 between different optical pathways generally may comprise any known means for conveniently, reliably and accurately moving a mechanical element through a specified distance upon command. The means will typically comprise electro-mechanical components arranged such that precise alignment of laser unit 6 with the different optical pathways is achieved in a reliable and convenient manner. One suitable means for moving laser unit 6 is illustrated in FIGS. 6 and 7. As illustrated in FIG. 6, the means includes a carriage 51 having base support 52, a laterally movable carriage plate 54 to which laser unit 6 is mounted, an actuation screw 56 for moving carriage plate 54, and a back-geared motor 60 for rotating screw 56. Carriage plate 54 preferably carries bearing (not shown) for slidable movement on base support 52. These elements are controlled as to position by means of first and second electrical sensor stops 63 and 65, and first and second mechanical stops 67 and 69, as shown in FIG. 7. Electrical sensor stops 63 and 65 may be electrical switched, such as microswitches, while mechanical stops 67 and 69 may be adjustable studs.

Laser unit 6 is selectively moved between two specified positions by way of carriage 51 in the following manner. In one fixed position of laser unit 6, as shown in solid line in FIG. 6, carriage plate 54 abuts against mechanical stop 67 and thus is maintained in a stable predefined position aligned with one optical pathway. When it is desired to move laser unit 6 to a different position, such as shown in broken line, the laser beam emitted therefrom can be aligned with a different optical path associated with different crystal doublers and front mirrors to thereby provide a different wavelength of radiation. Laser unit 6 is moved in a rectilinear manner by energizing motor 60 with a current of one polarity for rotating the motor shaft in a specified angular direction. Screw 56, which is connected directly to the motor shaft, or thereto by way of gears (not shown), is also rotated in a specified direction. Screw 56 mates with inner threads (not shown) formed within carriage plate 54 to thereby move plate 54, and thus laser unit 6, in a linear direction. In the example, carriage plate 54 is moved to the right, as noted in FIG. 1, until electrical stop 65, in the nature of a microswitch, is actuated. A contact closure, or opening, of electrical stop 65 is transmitted to a control (not shown) for interrupting the current to motor 60. The position of electrical stop 65 with respect to carriage plate 54 is preadjusted so when motor 60 stops, carriage plate 54 is abutted against mechanical stop 69. Laser unit 6 is thereby moved to the location shown in broken line, in a precise and efficient manner. Carriage plate 54 and thus laser unit 6 can be returned to the other location (shown in solid line) by actuating motor 60 with a current of opposite polarity, thereby rotating screw 56 in an opposite direction and moving carriage plate 54 to the left until electrical stop 63 is actuated. Such an arrangement is effective to move laser unit 6 in a linear path between two positions. A carriage of similar design suitable for use with the invention is obtainable from Newport Corporation, 18235 Mt. Baldy Circle, Fountain Valley, Calif.

While not shown, laser unit 6 can be mounted on a similar carriage structure, without the electrical and mechanical stops, and utilized to move laser unit 6 between numerous linear positions. With this technique, motor 60 can be equipped with an angular encoder, or a tachometer or similar device, for measuring the number of rotations of the motor shaft. With this information, and knowing the linear movement of carriage plate 54 for each turn of the motor shaft, the precise linear position of carriage plate 54, and thus laser unit 6, can be determined by appropriate control circuitry counting the number of rotations of the motor shaft.

Rather than constructing carriage 51 for linear movement, the carriage can be fabricated as a circular structure for moving carriage plate 54 in a circular path. In this situation, screw 56 would be flexible so that it would also follow a curved path, thereby pushing or pulling carriage plate 54 along the circular path. Again, the number of rotations of the motor shaft would translate into precise, accurate movements and positions of carriage plate 54, and thus laser unit 6, for precise alignment of laser unit 6 with accurately arranged crystal doublers and front mirrors for generating different wavelengths.

Figure 8:
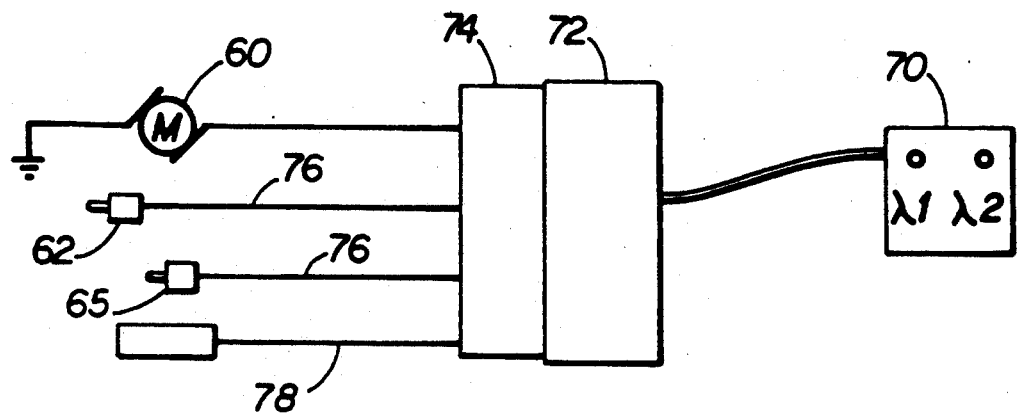
FIG. 8 is an electrical block diagram of a processor circuit for controlling the movement of the laser medium of the multiple laser cavity system illustrated in FIGS. 5-7.

FIG. 8 illustrates a control system operable by a surgeon, or user of the laser system, for controlling the position of laser unit 6 and thus the selection of various wavelengths capable of being generated. A position control 70 includes switches or other manually operable devices for allowing the user to select a particular wavelength of radiation to be used during the surgical procedure. A microprocessor 72, or other programmed or non-programmed circuits, are responsive to the selection of a particular wavelength for generating other signals via an interface 74 for applying or removing power from motor 60. It is contemplated that a reversible DC motor will be utilized for moving carriage plate 54 in response to positive or negative polarity current, although AC or pulsed DC motors can be used with equal advantage. Interface 74 includes driver circuits for providing sufficient current to motor 60 to rotate screw 56 and move carriage plate 54. Contact closures or open conditions from electrical stops 63 and 65 are transmitted by way of conductors 76 to interface 74 of microprocessor 72. In addition, motor shaft encoder signals can be transmitted to interface 74 by way of conductors 78. The signals on either set of conductors 76 or 78 can provide interrupts to microprocessor 72 for stopping motor 60 by halting the current supplied thereto. Microprocessor 72 typically will be programmed to count the number of shaft encoder pulses on conductor 78 to determine the exact position of laser unit 6. The positioning of equipment in such a manner with the electro-mechanical apparatus is disclosed in U.S. Pat. No. 4,145,593, the disclosure of which is incorporated herein by reference.

Figures 9A, 9B:
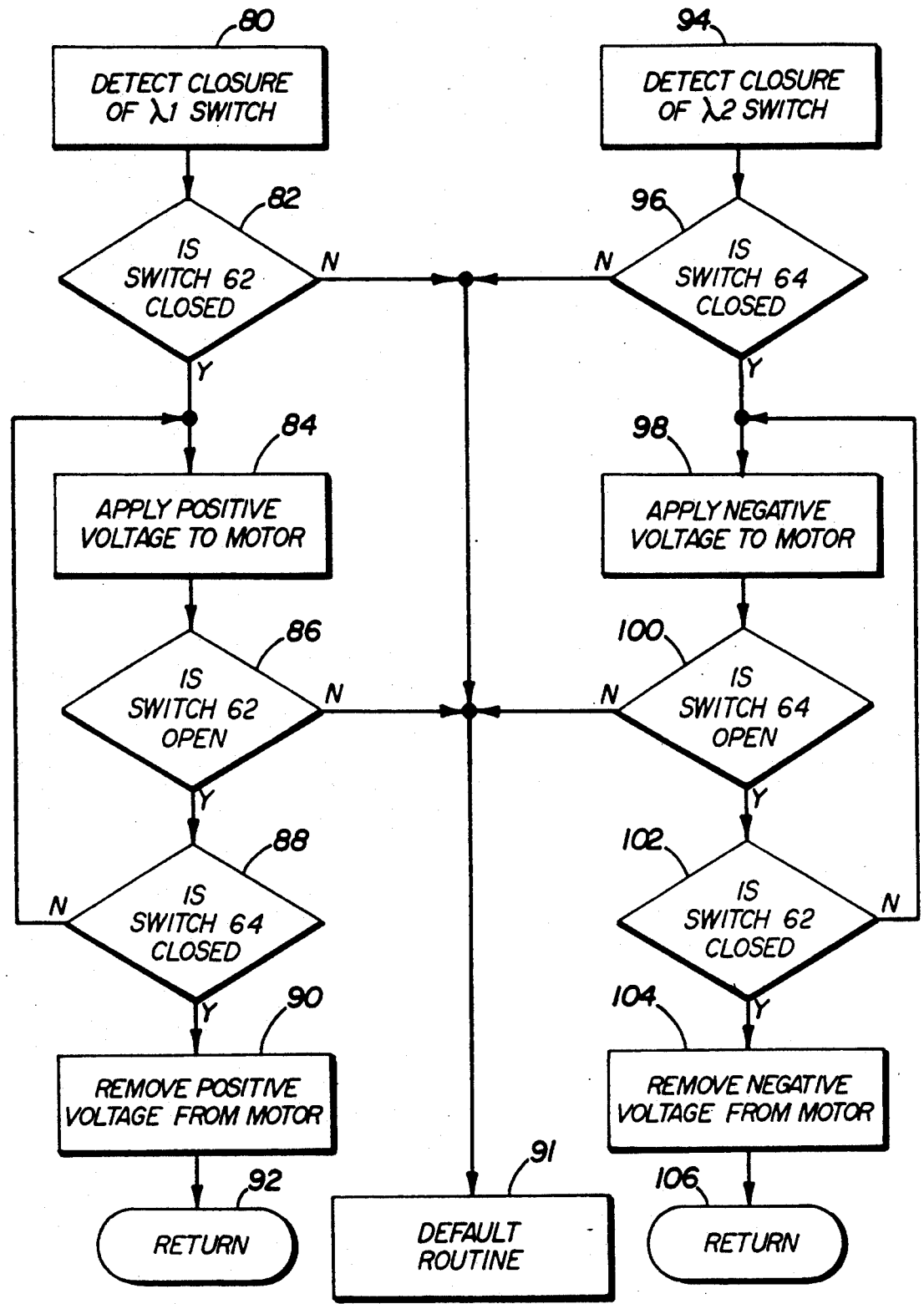
FIGS. 9a and 9b are flow charts of the programmed operation of the control circuit illustrated in FIG. 8.

FIGS. 9a and 9b illustrate more specifically the operation of the processor controlled circuit of FIG. 8. With respect to FIG. 9a, it is assumed that laser unit 6 is initially located at the left-hand position of FIG. 6 and is capable of producing one wavelength of radiation, and the user of the system desires the other wavelength of radiation. For purposes of illustration, it is assumed that with reference to FIG. 6, it is desired to change the wavelength from that shown by laser unit 6 in solid line ($\lambda 2$) to the position shown in broken line $\lambda_2$. It is further assumed that when laser unit 6 is in the position shown in FIG. 6, electrical switch 63 is closed and electrical switch 65 is open. At this time, and before the user provides an input into the system, microprocessor 72 is involved in a software loop indicated by program flow block 80. When in such loop, microprocessor 72 repetitively monitors position control switches 70 to determine if the operator desires laser unit 6 to be moved to the right, thereby generating a different wavelength.

In the event the operator pushes, or otherwise actuates the switch (not shown) indicating that laser unit 6 is to be moved to the right, microprocessor 72 detects such affirmative action according to block 80. As noted in program flow block 82, microprocessor 72 determines the state of switch 63, and if closed, interface 74 is caused to apply a positive voltage to motor 60, as noted in program flow block 84. Motor 60 is responsive to the positive voltage to rotate in a direction such that screw 56 is turned and carriage plate 54 is moved to the right. After motor 60 is actuated and carriage plate 54 has moved, microprocessor 72 determines whether switch 63 has opened, indicating the movement of laser unit 6 toward the other position. On an affirmative indication of the test of program flow block 86, processor 72 determines whether electrical switch 65 has closed, as noted by program flow block 88. Microprocessor 72 is maintained in the loop between blocks 84 and 88 until laser unit 6 has abutted against mechanical stop 69 and has closed electrical switch 65. When this occurs, microprocessor 72 transfers from block 88 to program flow block 90 where the positive polarity voltage is removed from motor 60. Laser unit 6 is thus accurately positioned as shown in the broken line of FIG. 6, thereby being aligned with the optical components such that $\lambda_2$, wavelength is generated. On a negative determination of program flow blocks 82 and 86, processor 72 defaults to software routine 91 to indicate that carriage plate 54 is stuck or jammed. After removal of the power from motor 60 as indicated in block 90, microprocessor 72 returns 92 to the program start for monitoring the detection of further inputs to control 70 by the operator of the system.

FIG. 9b illustrates the programmed operations of microprocessor 72 in responding to an input by the operator to move laser unit 6 to a position for generating the λ2 wavelength. When the λ2 switch is activated by the operator on control 70, such action is detected by microprocessor 72, as noted by program flow block 94. Microprocessor 72 determines, by way of blocks 96, that the state of switch 64 is closed, indicating that laser unit 6 is presently in a position for generating the λ2, wavelength. On an affirmative decision from block 96, microprocessor 72 applies a negative polarity voltage to motor 60, thereby causing screw 56 to turn in the direction to move laser unit 6 away from electrical stop 64. As noted in program flow block 100, the state of switch 64 is determined, and if open, control is transferred to program flow block 102. Here, microprocessor 72 determines whether or not switch 62 has yet been closed. If not, microprocessor 72 remains in the loop between blocks 98 and 102 until electrical switch 62 is closed. When closed, microprocessor 72 proceeds to block 104 removes the negative polarity voltage from motor 60, whereupon laser unit 6 remains in the stable position aligned with a different set of optical components for generating the λ2 wavelength. The microprocessor returns to the main program loop, as noted in block 106, for monitoring subsequent inputs from the system user, via control 70.

Figure 10:
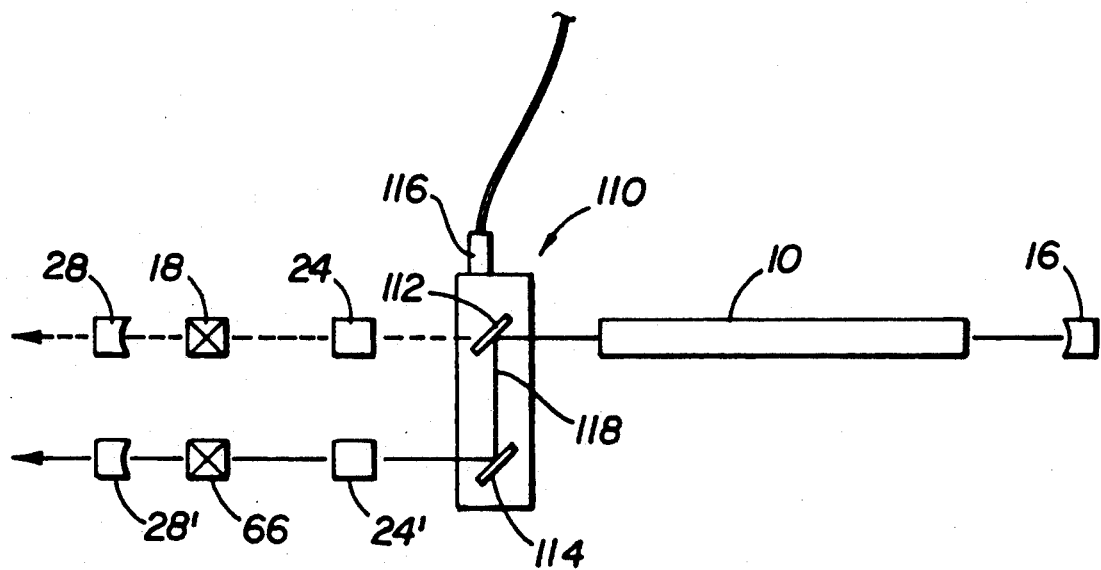
FIG. 10 is a schematic illustration of a fifth embodiment of the invention wherein switchable optical elements are used to switch the laser beam between a first optical path and a second optical path.

In accordance with another embodiment of the invention shown in FIG. 10, a single laser unit 6 is operable to generate multiple wavelengths of radiation by way of an optical switch 110 that is adapted to redirect the laser beam with respect to different optical paths. In this embodiment, laser unit 6 itself remains fixed, while the beam output therefrom is switched by optical switch 110. Optical switch 110 includes an upper reflective mirror 112 and a lower reflective mirror 114, each ganged together by linkage (not shown) so that both reflective mirrors 112 and 114 are moved in unison. An electrical actuator 116, such as a solenoid, is connected to the linkage for moving mirrors 112 and 114 in such a manner that in one position, the radiation beam emitted from laser unit 6 is unobstructed by upper mirror 112, and thus is directed along the radiation path shown in broken lines. When actuator 116 is actuated, upper and lower reflective mirrors 112 and 114 are moved at 45° angle positions into the path of the laser beam, thereby directing it downwardly along path 118, and then laterally along the path shown in solid line. With this arrangement, the laser beam can be directed in the optical path associated with harmonic isolator 24, or in a different optical path associated with harmonic isolator 24′, thereby producing different wavelengths. It will be understood that isolator 24 may be formed on harmonic crystals 18 and 66 as illustrated in FIG. 3 and each optical path may also include components 50 as illustrated in FIGS. 4 and 5. Rear mirror 16 is of the type which can operate effectively with both wavelengths, such as a fundamental and harmonics, and thus there is a single rear mirror 16 associated with both front mirrors 28 and 28′. Again, electrical actuator 116 can be actuated by switches operable by the user of the system.

From the foregoing, disclosed is a laser system employing a wavelength doubling apparatus for producing an output different from an internally-generated fundamental wavelength. The optical components of the invention are arranged in an intra-cavity manner to provide isolation between the crystal doubler and the other optical components located on the laser medium side of the cavity. While the various embodiments of the invention have been disclosed with reference to specific structures and operations, it is to be understood that many changes in detail may be made as a matter of engineering choices without departing from the spirit and scope of the invention as defined by the appended claims.

I claim:
1. A laser system having a linear cavity, comprising:
   a. a lasing medium for producing a fundamental wavelength of radiation having a front face and a longitudinal axis;
   b. a first mirror reflective of the fundamental wavelength but transmissive of a desired harmonic wavelength located in front of the laser medium along the longitudinal axis;
   c. a second mirror reflective of both the fundamental wavelength and the desired harmonic wavelength located to a rear of the lasing medium along the longitudinal axis;
   d. a harmonic wavelength generator responsive to the fundamental wavelength for generating the desired harmonic wavelength of radiation arranged between the front mirror and the lasing medium along the longitudinal axis; and
   e. a harmonic wavelength isolator transmissive of the fundamental wavelength but reflective of the harmonic wavelength arranged between the laser medium and the harmonic wavelength generator along the longitudinal axis.

2. The laser system of claim 1 wherein the harmonic wavelength isolator comprises a dichroic member.

3. The laser system of claim 2 wherein the dichroic member is formed on the front face of the lasing medium.

4. The laser system of claim 2 wherein the dichroic member is formed on a face of the harmonic wavelength generator.

5. The laser system of claim 1 further comprising a focusing element aligned along the longitudinal axis between the lasing medium and the harmonic generator for focusing the fundamental wavelength of radiation onto the harmonic wavelength generator.

6. The laser system of claim 1 wherein the lasing medium comprises a yttrium-aluminum-garnet laser rod.

7. The laser system of claim 6 wherein the harmonic wavelength isolator comprises a dichroic member.

8. The laser system of claim 7 wherein the dichroic member is formed on the front face of the lasing medium.

9. The laser system of claim 7, wherein the dichroic member is formed on a face of the harmonic wavelength generator.

10. The laser system of claim 1 wherein the lasing medium comprises a yttrium-lithium-fluoride laser rod.

11. The laser system of claim 10, wherein the optical element comprises a dichroic member.

12. The laser system of claim 11, wherein the dichroic member is formed on the front face of the lasing medium.

13. The laser system of claim 12, wherein the dichroic member is formed on a face of the harmonic wavelength generator.

14. The laser system of claim 1, wherein the harmonic wavelength generator is effective to double the fundamental frequency of radiation generated by the lasing medium.

15. The laser system of claim 1, wherein the harmonic wavelength generator comprises a phase matched crystal.

16. The laser system of claim 15, wherein the crystal comprises, Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo3, RbTP, RbTA, YAB, KNbO3, or Urea.

17. The laser system of claim 1, wherein the harmonic wavelength generator comprises, Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo3, RbTP, RbTA, YAB, KNbO3, Urea or BANANA crystals.

18. A laser system having a linear cavity, comprising:
   a. a yttrium-aluminum-garnet laser rod for producing a fundamental wavelength of radiation having a front face and a longitudinal axis;
   b. a first mirror reflective of the fundamental wavelength but transmissive of a desired harmonic wavelength located in front of the laser rod along the longitudinal axis;
   c. a second mirror reflective of both the fundamental wavelength and the desired harmonic wavelength located to a rear of the lasing rod along the longitudinal axis;
   d. a phase matched crystal harmonic wavelength generator responsive to the fundamental wavelength for generating the desired harmonic wavelength of radiation arranged between the front mirror and the lasing rod along the longitudinal axis; and
   e. a dichroic member transmissive of the fundamental wavelength but reflective of the harmonic wavelength arranged between the laser rod and the harmonic wavelength generator along the longitudinal axis.

19. The laser system of claim 18 further comprising a focusing element aligned along the longitudinal axis between the lasing rod and the harmonic generator for focusing the fundamental wavelength of radiation onto the harmonic wavelength generator.

20. The laser system of claim 18, wherein the crystal comprises, Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo3, RbTP, RbTA, YAB, KNbO3 or Urea.

21. A laser system, comprising:
   a. a first cavity portion having a lasing medium for generating a fundamental wavelength of radiation and a rear mirror for reflecting the fundamental wavelength;
   b. a plurality of second cavity portions having,
      i) a harmonic wavelength generator responsive to the fundamental wavelength for generating a harmonic wavelength,
      ii) a harmonic wavelength isolator transmissive of the fundamental wavelength but reflective of the harmonic wavelength and
      iii) a front mirror reflective of the fundamental wavelength but transmissive of a desired harmonic wavelength;
   c. a means for moving the first cavity portion in alignment with one of the second cavity portions; and
   d. an angled output reflective element associated with each second cavity portion for defining a common output path.

22. The laser system of claim 21 wherein the harmonic wavelength isolator comprises a dichroic member.

23. The laser system of claim 22 wherein the dichroic member is formed on the front face of the lasing medium.

24. The laser system of claim 22 wherein the dichroic member is formed on a face of the harmonic wavelength generator.

25. The laser system of claim 21 wherein the second cavity portions further comprising a focusing element for focusing the fundamental wavelength of radiation onto the harmonic wavelength generator.

26. The laser system of claim 21 wherein the lasing medium comprises a yttrium-aluminum-garnet laser rod.

27. The laser system of claim 26 wherein the harmonic wavelength isolator comprises a dichroic member.

28. The laser system of claim 27 wherein the dichroic member is formed on the front face of the lasing medium.

29. The laser system of claim 27 wherein the dichroic member is formed on a face of the harmonic wavelength generator.

30. The laser system of claim 21 wherein the lasing medium comprises a yttrium-lithium-fluoride laser rod.

31. The laser system of claim 30, wherein the optical element comprises a dichroic member.

32. The laser system of claim 31, wherein the dichroic member is formed on the front face of the lasing medium.

33. The laser system of claim 32, wherein the dichroic member is formed on a face of the harmonic wavelength generator.

34. The laser system of claim 21, wherein the harmonic wavelength generator is effective to double the fundamental frequency of radiation generated by the lasing medium.

35. The laser system of claim 21, wherein the harmonic wavelength generator comprises a phase matched crystal.

36. The laser system of claim 35, wherein the crystal comprise Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo3, RbTP, RbTA, YAB, KNbO3, or Urea.

37. The laser system of claim 21, wherein the harmonic wavelength generator comprises, Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo3, RbTP, RbTA, YAB, KNbO3, Urea or BANANA crystals.

38. The laser system of claim 21 wherein the means for moving the first cavity portion is alignment with one of the second cavity portions comprises a sliding carriage.

39. The laser system of claim 21 wherein the harmonic wavelength isolator comprises a dichroic member.

40. The laser system of claim 39 wherein the dichroic member is formed on the front face of the lasing medium.

41. The laser system of claim 39 wherein the dichroic member is formed on a face of the harmonic wavelength generator.

42. A laser system, comprising:
   a. a first cavity portion having a yttrium-aluminum-garnet laser rod for generating a fundamental wavelength of radiation and a rear mirror for reflecting the fundamental wavelength;
   b. a plurality of second cavity portions having,
      i) a phase matched crystal responsive to the fundamental wavelength for generating a harmonic wavelength,
      ii) a dichroic member transmissive of the fundamental wavelength but reflective of the harmonic wavelength and
      iii) a front mirror reflective of the fundamental wavelength but transmissive of a desired harmonic wavelength;
   c. a sliding carriage for moving the first cavity portion in alignment with one of the second cavity portions; and
   d. an angled output reflective element associated with each second cavity portion for defining a common output path.

43. A laser system, comprising:
   a. a first cavity portion having a yttrium-aluminum-garnet laser rod for generating a fundamental wavelength of radiation and a rear mirror for reflecting the fundamental wavelength;
   b. a second and a third cavity portions each having,
      i) a phase matched crystal responsive to the fundamental wavelength for generating a harmonic wavelength,
      ii) a harmonic wavelength isolator transmissive of the fundamental wavelength but reflective of the harmonic wavelength and
      iii) a front mirror reflective of the fundamental wavelength but transmissive of a desired harmonic wavelength; and
   c. a means for alternatively aligning an output of the laser rod between the second cavity portion and the third cavity portion.

44. The laser system of claim 43 wherein the alignment means comprises an upper mirror aligned with the second cavity portion and a lower mirror aligned with the third cavity portion linked together to rotate in unison.

45. The laser system of claim 44 wherein the second cavity portions further comprising a focusing element for focusing the fundamental wavelength of radiation onto the harmonic wavelength generator.

46. The laser system of claim 44 wherein the lasing medium comprises a yttrium-lithium-fluoride laser rod.

47. The laser system of claim 46, wherein the optical element comprises a dichroic member.

48. The laser system of claim 47, wherein the dichroic member is formed on the front face of the lasing medium.

49. The laser system of claim 48, wherein the dichroic member is formed on a face of the harmonic wavelength generator.

50. The laser system of claim 44 wherein the lasing medium comprises a yttrium-aluminum-garnet laser rod.

51. The laser system of claim 50 wherein the harmonic wavelength isolator comprises a dichroic member.

52. The laser system of claim 51 wherein the dichroic member is formed on the front face of the lasing medium.

53. The laser system of claim 51, wherein the dichroic member is formed on a face of the harmonic wavelength generator.

54. The laser system of claim 41, wherein the harmonic wavelength generator is effective to double the fundamental frequency of radiation generated by the lasing medium.

55. The laser system of claim 41, wherein the harmonic wavelength generator comprises a phase matched crystal.

56. The laser system of claim 41, wherein the harmonic wavelength generator comprises, Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo$_3$, RbTP, RbTA, YAB, KNbO$_3$, Urea or BANANA crystals.

57. The laser system of claim 55, wherein the crystal comprises, Potassium dihydrogen phosphate, Potassium dideuterium phosphate, Potassium titanyl phosphate, Lithium triborate, Beta-barium borate, KTA, lithium niobate doped with MgO, Lithium iodate, MgO:LiNbo$_3$, RbTP, RbTA, YAB, KNbO$_3$, or Urea.

* * * * *